(12) United States Patent  (10) Patent No.: US 7,590,678 B2
Jääskelä et al.  (45) Date of Patent: Sep. 15, 2009

(54) SHARING NETWORK INFORMATION

(75) Inventors: Pasi Jääskelä, Kempele (FI); Keijo Hasa, Oulu (FI)

(73) Assignee: Nokia Corporation, Espoo (FI)

( * ) Notice: Subject to any disclaimer, the term of this patent is extended or adjusted under 35 U.S.C. 154(b) by 767 days.

(21) Appl. No.: 10/603,080

(22) Filed: Jun. 25, 2003

(65) Prior Publication Data

US 2004/0133685 A1  Jul. 8, 2004

(30) Foreign Application Priority Data

Jun. 28, 2002  (GB) .................................. 0215038.1

(51) Int. Cl.
G06F 15/16  (2006.01)
(52) U.S. Cl. ........................ 709/200; 455/406; 455/445; 455/432.1; 379/114.01; 379/221.02; 379/221.08; 379/221.14
(58) Field of Classification Search ................. 455/406, 455/407, 445, 432.1, 408, 459, 461; 370/328, 370/352, 351, 260; 379/220.01, 121.01, 379/352, 115.01, 207.02, 221.01, 114.2, 379/201.01; 709/223, 224, 227; 707/10
See application file for complete search history.

(56) References Cited

U.S. PATENT DOCUMENTS 5,699,416 A * 12/1997 Atkins .................... 379/115.01

(Continued)

FOREIGN PATENT DOCUMENTS

| EP | 0 767 572 A2 | 4/1997 |
| WO | WO 98/27750 | 6/1998 |
| WO | WO-2001-008425 | 2/2001 |
| WO | WO 03/103265 | 12/2003 |

OTHER PUBLICATIONS

Global System for Mobile Communications; 3rd Generation Partnership Project; Technical Specification Group Core Network; IP Multimedia (IM) Session Handling; IP Mutilmedia (IM) call model; Stage 2 (Release 5); 3GPP TS 23.218 v5.1.0 (Jun. 2002); pp. 1-54.
J. Rosenberg, et al., SIP: Session Initation Protocol; Network Working Group; Jun. 2002, pp. 1-269.

*Primary Examiner*—Dustin Nguyen
(74) *Attorney, Agent, or Firm*—Squire, Sanders & Dempsey, L.L.P.

(57) ABSTRACT

A method for determining a regime to be applied to a connection in a communication system by means of which connections may be made to terminals associated with any of a plurality of operators, each terminal being addressable by means of a subscriber identity formatted to include a first field and a second field, the first field being, for at least some of the subscriber identities indicative of the operator with which a respective subscriber identity is associated, the method comprising: transmitting to an operator determination function of the network a first message requesting a regime for a connection and including a subscriber identity field comprising an indication of the subscriber identity of the terminal that is to terminate the connection; receiving the first message at the operator determination function; determining by means of the operator determination function the operator to which the subscriber identity of the terminal that is to terminate the connection is assigned, and content of the first field that is associated with that operator; forming at the operator determination function a modified subscriber identity having as its second field at least the content of the second field of the subscriber identity of the terminal that is to terminate the connection and having as its first field the said content of the first field that is associated with that operator; forming a second message requesting a regime for a connection and including a subscriber identity field comprising the modified subscriber identity; and transmitting the second message to a regime determination function arranged to analyze a subscriber identity received in a message requesting a regime for a connection to determine a regime based on the first field of the received subscriber identity.

34 Claims, 8 Drawing Sheets

U.S. PATENT DOCUMENTS

| | | | |
|---|---|---|---|
| 5,881,145 A | 3/1999 | Giuhat et al. | |
| 6,134,316 A | 10/2000 | Kallioniemi et al. | |
| 6,192,115 B1 | 2/2001 | Toy et al. | |
| 6,195,427 B1 * | 2/2001 | Hansen et al. | 379/352 |
| 6,195,543 B1 * | 2/2001 | Granberg | 455/407 |
| 6,345,182 B1 * | 2/2002 | Fabritius et al. | 455/408 |
| 6,421,674 B1 * | 7/2002 | Yoakum et al. | 707/10 |
| 6,430,276 B1 * | 8/2002 | Bouvier et al. | 379/121.01 |
| 6,535,741 B1 * | 3/2003 | Aschir et al. | 455/445 |
| 6,545,987 B1 * | 4/2003 | Becher | 370/328 |
| 6,662,017 B2 * | 12/2003 | McCann et al. | 455/461 |
| 6,671,361 B2 * | 12/2003 | Goldstein | 379/201.01 |
| 6,799,041 B1 * | 9/2004 | Dressel et al. | 455/445 |
| 6,839,421 B2 * | 1/2005 | Ferraro Esparza et al. | 379/220.01 |
| 6,876,860 B1 * | 4/2005 | Berg et al. | 455/459 |
| 6,959,076 B2 * | 10/2005 | Chang et al. | 379/207.02 |
| 6,977,909 B2 * | 12/2005 | Minborg | 370/260 |
| 7,027,582 B2 * | 4/2006 | Khello et al. | 379/220.01 |
| 7,043,229 B2 * | 5/2006 | Hazlewood | 455/406 |
| 7,096,023 B1 * | 8/2006 | Eikkula | 455/445 |
| 7,218,722 B1 * | 5/2007 | Turner et al. | 379/221.02 |
| 7,466,807 B2 * | 12/2008 | McCann et al. | 379/114.2 |
| 2002/0176405 A1 * | 11/2002 | Aijala | 370/352 |
| 2003/0081754 A1 * | 5/2003 | Esparza et al. | 379/221.01 |
| 2004/0028032 A1 * | 2/2004 | Rantanen et al. | 370/352 |
| 2004/0103191 A1 * | 5/2004 | Larsson | 709/224 |
| 2004/0174859 A1 * | 9/2004 | Serroyen et al. | 370/351 |
| 2004/0242226 A1 * | 12/2004 | Bot et al. | 455/432.1 |

* cited by examiner

SHARING NETWORK INFORMATION

This invention relates to means for sharing information on the operator with which a communication subscriber is associated. Such information may, for instance, be used to help fix the tariff for connections to the subscriber's terminal.

In many communication systems, for example telephony systems, a number of operators provide communication services to subscribers. When one subscriber (the A party) initiates a communication session with another subscriber (the B party) the tariff for that communication session is dependent on which operators each of the subscribers is associated with. Normally the tariff is greater for communications between subscribers of different operators than for communications between subscribers of the same operator.

Each subscriber is normally identified by an identity code, such as a telephone number. When communication systems are established each operator is normally allocated one or more blocks of identity codes, and then the allocation of codes within each block can be delegated to the respective operator. For convenience each block normally has a common prefix and the operator allocates the characters following the prefix. For example, an operator may be allocated the prefix 0777, and can then allocate the numbers 0777 111 111, 0777 111 112 etc. In a system of this type it is possible to identify by means of the prefix the operator with which a subscriber's identity code is associated. This makes it convenient to determine the tariff for a communication session. When an A party initiates a communication session to a B party the operator with which the B party is associated can be determined from the B party's subscriber identity code. The A party may also be known as the originating party. The B party may also be known as the terminating party. The B party's subscriber identity code is often known as the B number or the called party number (CdPN).

Figure 1:
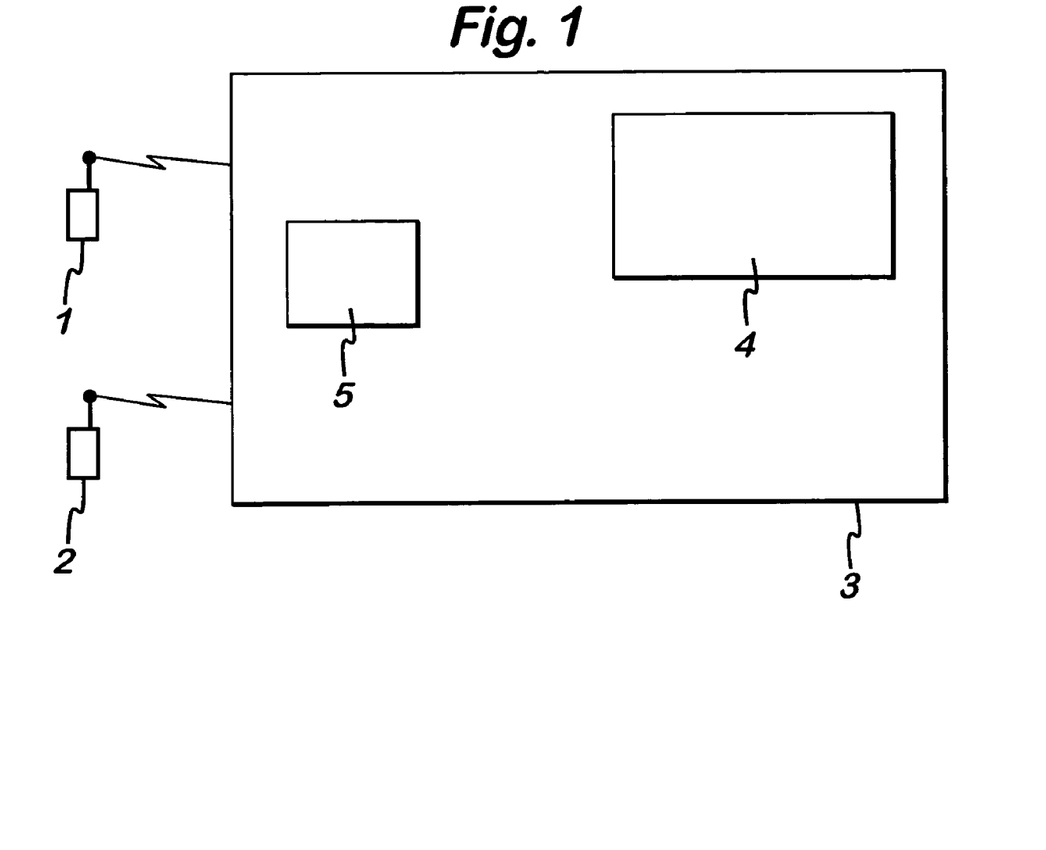
FIG. 1 is a schematic diagram of a telecommunications network.

FIG. 1 illustrates some components of a mobile phone system. In the system of FIG. 1 there are two mobile stations (MSs) 1, 2 which can communicate by radio with a network 3. Each mobile station has a subscriber identity module (SIM) which stores a code that identifies the subscriber identity code that the mobile station is using. For example, in the GSM system each subscriber has two identity codes:

1. IMSI (International Mobile Subscriber Identity) or E.212. This number is stored on the subscriber's SIM card, but it is not portable when the subscriber changes to another operator. In general no-one other than the operator normally needs to know that number.

2. MSISDN (Mobile Subscriber International ISDN number) or E.164 or directory number or telephony number. An A party needs to know that number when calling to a B party. This number is not stored on the SIM card, but this number is portable when number portability is used. This corresponds to the identity referred to herein as an identity code.

When one of the mobile stations (MS 1, say) wants to initiate a communication session (e.g. a telephone call) with the other a message is transmitted to a charging control unit 4, which is to determine the tariff for the communication session. The tariff depends on the operator with which the subscriber identity used by the MS 2 (the B party). The message sent to the charging control unit 4 includes the subscriber identity of the B party. The charging control unit stores a look-up table listing subscriber identity code prefixes against their respective operators. To determine the operator with which the B party is associated the charging control unit performs a look-up in the table using the prefix of the subscriber identity of the B party. This returns the identity of the relevant operator, and based on that information the charging control unit can determine a tariff for the communication session.

Figure 2:
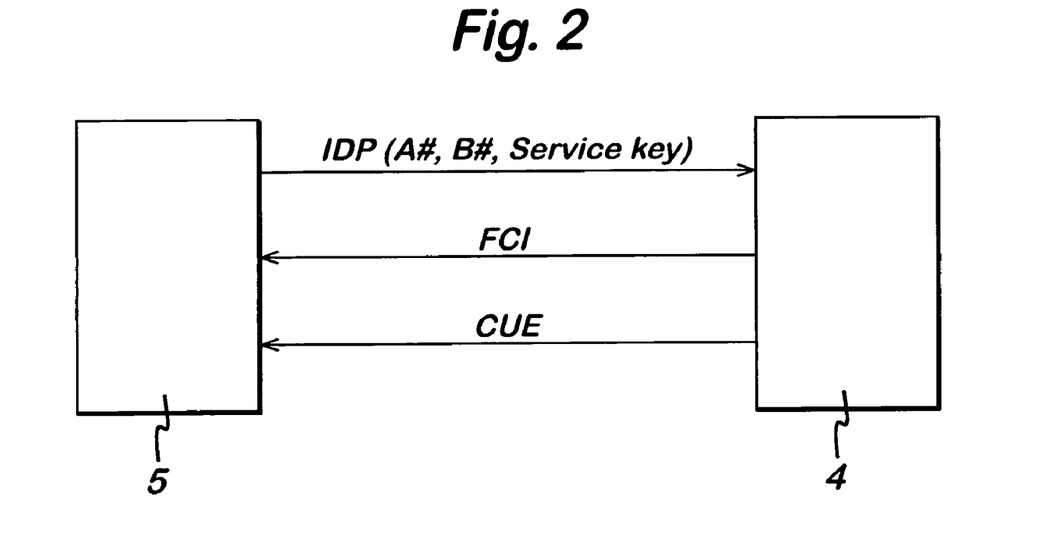
FIG. 2 shows signalling during call set-up.

The charging control unit 4 could be a service control point (SCP) of an intelligent network (IN) in a third-generation (3G) or UMTS (Universal Mobile Telecommunications System) network, or a service control function (SCF) in a GSM (Global System for Mobile Telecommunications) network. FIG. 2 illustrates the signalling that takes place when a connection is set up. The MSC (mobile switching centre 5) of the network passes to the SCP/SCF 4 an IDP (initial DP (detection point) operation) message including the number of the A party (the A number), the number of the B party (the B number) and the service key. The SCP/SCF then analyses the B number to determine the tariff to be applied to the connection and returns that to the MSC in FCI (furnish charging information) and CUE (continue) messages. Using the information in the FCI and CUE messages the MSC can cause the connection to be billed according to the appropriate tariff.

There are moves to introduce number portability for subscribers to mobile telephone networks. Under number portability subscribers will be able to move their subscription from one operator to another whilst keeping the same subscriber identification code. This will break the one-to-many relationship between operators and subscriber identification codes. Under number portability the subscriber identification code of a subscriber who has changed operators and kept their subscriber identification code will have a prefix that corresponds to the operator from which the subscriber has moved, not the operator with which the subscriber is now associated.

This will cause problems in determining the tariff to be applied to a communication session, since a billing control unit will no longer be able to use a look-up table of operator prefixes to determine the operator with which the B party is associated.

Two solutions to this problem are currently available. First, the charging control unit could store a more detailed supplementary look-up table of all subscriber identity codes, or those codes that are exceptions to the usual correlations between prefixes and operators. However, such a supplementary look-up table would be very large, and the tables of all the charging control units in a system would require constant updating to keep track of subscribers as they change networks. Alternatively, the charging control unit could be arranged to query an external database to fetch the operator information itself. Both of these options would require the charging control unit to be substantially reconfigured. With large numbers of SCFs already in use this would be very expensive.

There is therefore a need for an improved means of coping with the issues such as those that arise from number portability.

According to the present invention there is provided a method for determining a regime to be applied to a connection in a communication system by means of which connections may be made to terminals associated with any of a plurality of operators, each terminal being addressable by means of a subscriber identity formatted to include a first field and a second field, the first field being, for at least some of the subscriber identities indicative of the operator with which a respective subscriber identity is associated, the method comprising: transmitting to an operator determination function of the network a first message requesting a regime for a connection and including a subscriber identity field comprising an indication of the subscriber identity of the terminal that is to terminate the connection; receiving the first message at the operator determination function; determining by means of the operator determination function the operator to which the subscriber identity of the terminal that is to terminate the connection is assigned, and content of the first field that is associated with that operator; forming at the operator determination function a modified subscriber identity having as its second field at least the content of the second field of the subscriber identity of the terminal that is to terminate the connection and having as its first field the said content of the first field that is associated with that operator; forming a second message requesting a regime for a connection and including a subscriber identity field comprising the modified subscriber identity; and transmitting the second message to a regime determination function arranged to analyse a subscriber identity received in a message requesting a regime for a connection to determine a regime based on the first field of the received subscriber identity.

According to a second aspect of the present invention there is provided an operator determination function for use in determining a regime to be applied to a connection in a communication system by means of which connections may be made to terminals associated with any of a plurality of operators, each terminal being addressable by means of a subscriber identity formatted to include a first field and a second field, the first field being, for at least some of the subscriber identities indicative of the operator with which a respective subscriber identity is associated, the operator determination function comprising: an operator determination unit responsive to receiving a first message comprising an indication of the subscriber identity of the terminal that is to terminate the connection to determine the operator to which the subscriber identity of the terminal that is to terminate the connection is assigned, and content of the first field that is associated with that operator; an identity modifier arranged to receive the said content and form a modified subscriber identity having as its second field at least the content of the second field of the subscriber identity of the terminal that is to terminate the connection and having as its first field the said content of the first field that is associated with that operator; a message former arranged to receive the modified subscriber identity and form a second message requesting a regime for a connection and including a subscriber identity field comprising the modified subscriber identity; and a message transmitter for transmitting the second message to a regime determination function arranged to analyse a subscriber identity received in a message requesting a regime for a connection to determine a regime based on the first field of the received subscriber identity.

Preferably the regime is a tariff. Alternatively, the regime could be a priority, a routing preference or a quality of service target to be applied to the connection.

Suitably the method comprises: transmitting together with the indication of the subscriber identity of the terminal that is to terminate the connection an indication of the type of the connection; forming the second message so as to include the indication of the type of the connection; the regime determination function being arranged to determine the regime based on the first field of the received subscriber identity and the indication of the type of the connection.

In one embodiment the operator determination function has access to a first database that stores a list of subscriber identities and for each one an indication of the operator with which the respective subscriber identity is associated, and the said determining step includes looking up the subscriber identity of the terminal that is to terminate the connection in the first database and retrieving any indication of an operator associated therewith in the first database. The absence of a subscriber identity from the database may indicate that the content of the first field of that subscriber identity is associated with the operator to which that subscriber identity is assigned, The indication of an operator may be the said content of the first field that is associated with that operator. Alternatively the operator determination function may have access to a second database that stores a list of indicators of operators and for each one content of the first field that is associated with that operator, and the said determining step may comprises looking up the said indication of an operator in the second database and retrieving content of the first field associated therewith.

The subscriber identity field of the message requesting a regime for a connection preferably does not include the first field of the subscriber identity of the terminal that is to terminate the connection. Most preferably it consists of the subscriber identity of the terminal that is to terminate the connection Preferably, if in the said determining step it is determined that the content of the first field of the subscriber identity of the terminal is associated with the operator to which that subscriber identity is assigned, the second message requesting a regime for a connection is formed with its subscriber identity field comprising the subscriber identity unmodified.

The messages may, for instance, be IDP messages or SIP INVITE messages.

Preferably each subscriber identity is a telephony number. Preferably each subscriber identity is a directory number by which the mobile station is reached, e.g. an MSISDN. Preferably each first field is an operator prefix.

Preferably the regime determination function comprises one or more of a service control point (SCP) of an intelligent network (IN) and a service control function (SCF).

Each message requesting a regime for a connection preferably comprises a source field for indicating the source of the message. Preferably the source fields of both the first and second messages comprise an indication of the source of the first message, and most preferably not that of the second message.

Preferably the method comprises: the regime determination function determining a regime for the connection; and applying the regime to the connection.

The connection is preferably a connection for transfer of data, which could include voice data.

The present invention will now be described by way of example with reference to the accompanying drawings.

Figure 3:
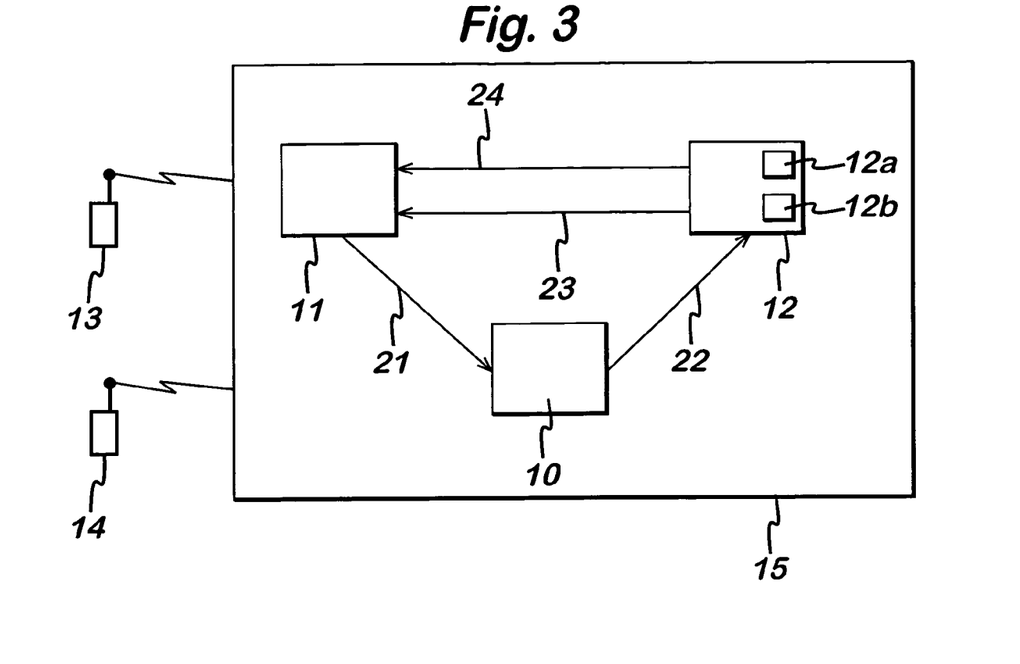
FIG. 3 is a schematic diagram of a telecommunications network including a pre-charging number portability database.

FIG. 3 is a schematic diagram of a telecommunications network including a pre-charging number portability formatter 10. This example is illustrated with reference to a 3G network, but the principle could be applied to networks of other types. When a connection is set up the service switching point (SSP) 11 does not signal the SCP 12 directly with the B-party's number, as it would in a conventional system. Instead it signals the SSP via the formatter 10. The formatter 10 determines the operator with which the B-number is associated and passes this to the SCP. In this example the formatter signals the identity of the operator to the SCP in the form of a subscriber identity prefix that is associated with that operator. That means that the SCP can operate as it normally does to identify the operator: i.e. by means of a prefix that is associated with the operator.

The operation of the system of FIG. 3 will now be described in more detail. FIG. 3 shows the relevant parts of a 3G telecommunications network. The network includes a charging control unit 12, which in this example includes a first processing entity 12a which acts as an SCP or SCF for pre-paid subscribers, and a second processing entity 12b which acts as an SCP for account subscribers. Both processing entities cooperate to provide an integrated SCP function. The network includes at least one SSP 11, which acts in a similar way to an MSC in a GSM network: that is to supervise switching and call control (including charging) as a connection is set up, proceeds and is terminated. For illustration mobile stations 13, 14, which can communicate by radio with the network 15 in which the units 10 to 12 operate.

The signalling that takes place during connection set-up in order to pass the tariff information to the SSP 11 is illustrated by steps 21 to 24 in FIG. 3. At step 21 the SSP 11 transmits an IDP message to the formatter 10. That IDP message includes the identity code of the A subscriber (the A number), the identity code of the B subscriber (the B number) and the service key. On receiving that message the formatter performs look-ups to determine the operator with which the B number is associated (the details of these look-ups will be described later) and then to determine a subscriber identity code prefix with which that operator is associated. This will be termed the operator prefix. Then in step 22 the formatter 10 transmits an IDP message to the charging control unit 12. That IDP message comprises the A number, the operator prefix, the B number and the service key. On receiving that message the charging control unit 12 analyses the message and determines a tariff for the connection based on information including the operator prefix. This will be described in more detail below. On determining the tariff the charging control unit transmits information identifying the tariff to the SSP in an FCI tariff information message. (Step 23). It also transmits a continue message (step 24) to the SSP to authorise it to continue with the set-up of the connection. Charging of the connection is performed in accordance with the tariff indicated in the message sent at step 23.

Figure 4:
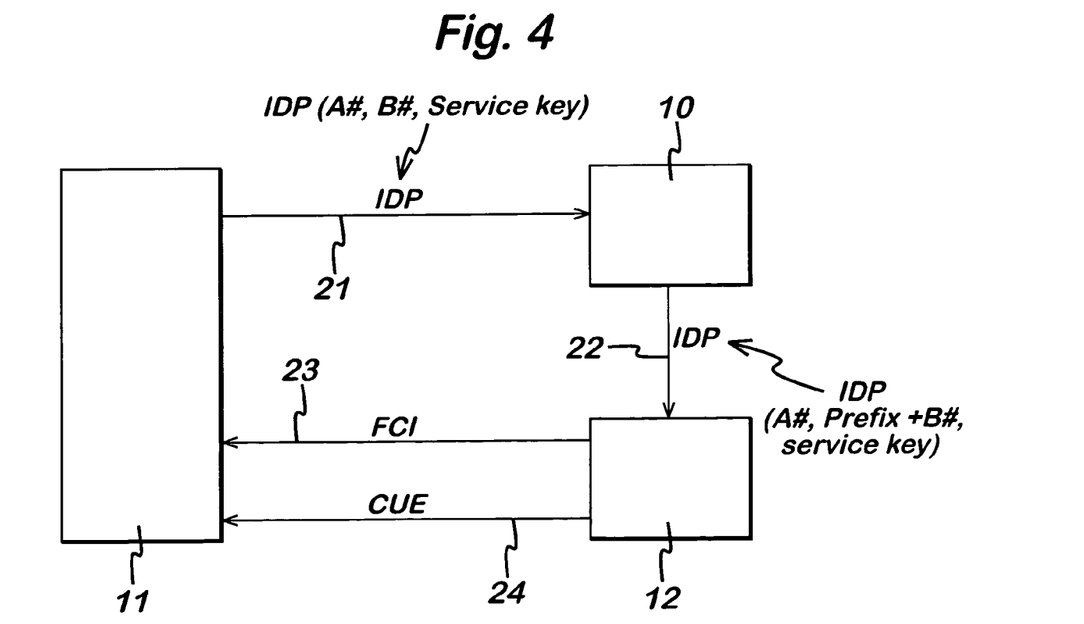
FIG. 4 shows signalling in the system of FIG. 3.

To contrast this mechanism with the one shown in FIG. 2, FIG. 4 is a block diagram showing the units 10, 11 and 12 and signalling steps 21, 22, 23 and 24. It will be seen that the formatter 10 acts as an intermediary between the SSP or MSC 11 and the SCP or SCF 12.

In this embodiment the formatter 10 performs a look-up to determine the operator prefix. It access a database to determine the operator with which the B number is associated. In a system such an GSM or UMTS that is the operator of the B subscriber's home network. The database could be that of an SSRi of the network, or an equivalent function. Performing a look-up on the B number using the SSRi can return the direction specific data (DIRE) that is associated with the B number. The DIRE includes a subscription network identifier (SNID) which can be used as the operator prefix. It will be appreciated that the formatter could use other mechanisms to derive the operator prefix; for example, the formatter could store its own database of subscriber numbers and the operator associated with each one, and a database of subscriber prefixes associated with each operator. Alternatively it could store a database of numbers that have been moved from one operator to another, with for each one an indication of the operator to which they have been moved, and a database indicating a subscriber prefix associated with each operator. In the latter case the database of numbers that have been moved would be analogous to a number portability database (NPDB) of some circuit switched (CS) networks.

The charging control unit determines the tariff to be used for the connection based on information including the operator with which the subscriber representing the B-party is associated. In the normal case, the charging control unit would analyse the prefix of the B-number as received in a message requesting a tariff for a connection. Based on that prefix it would determine the operator to which that prefix relates. Then it would determine a tariff for the connection. Other information that could also be taken into account in determining the tariff include the time of day, the day of the week and the service type of the connection. When the operator prefix is prepended to the B-number exactly the same processing can be performed to yield the same result. An illustration of this is given below.

In this illustration it is assumed that the format of the B-number is conventionally such that the first five digits of the B-number represent the operator with which it is associated. Thus in this example the B-number has two fields. One is represented by the first five digits of the number. It conventionally indicates the operator to which the number is assigned, although it does not do so when the number has been ported from one operator to another. The other field is represented by the remainder of the number. It will be appreciated that the two fields could take other forms than a prefix and a suffix.

The charging control unit stores a table (table 1) indicating tariffs for connections of different types to different operators. For simplicity the table in this example uses only two variables, but in a practical example more could be used.

TABLE 1

|  | Connection Type | | |
| --- | --- | --- | --- |
|  | X | Y | Z |
| Operator | | | |
| A | Tariff 2 | Tariff 1 | Tariff 1 |
| B | Tariff 3 | Tariff 3 | Tariff 2 |
| C | Tariff 5 | Tariff 4 | Tariff 5 |

The charging control unit also stores a table (table 2) indicating the operator conventionally associated with each of a number of B-number prefixes.

TABLE 2

| Prefix | Operator |
| --- | --- |
| 07114 | A |
| 07115 | C |
| 07198 | B |
| 07457 | B |
| 07777 | A |

The charging control unit is configured to perform the following steps when it receives a request for a tariff for a connection of a certain type to a certain B-number.

1. Look up the first five digits of the B-number in table 2 to determine the corresponding operator.
2. Look up the determined operator and the connection type in table 1 to determine the tariff.
3. Return the tariff to the entity that requested it.

Thus if the charging control unit received a request for a tariff for a connection of type X to B-number 07198 154786 it would:

1. Look up digits 07198 in table 2 and thereby determine that they relate to operator B.
2. Look up operator B and type X in table 1 and thereby determine that the tariff should be tariff 3.
3. Return an indication of tariff 3 to the requesting entity.

Now, in the system described above, the B-number as transmitted to the charging control unit is modified by the pre-pending of an operator prefix. For example the number 07198 154786 might have been moved to being associated with operator C. In that case the operator prefix 07115 could be pre-pended by the formatter so that the B-number as received by the charging control unit is now 0711507198 154786. In this case the first five digits of the B-number as received by the charging control unit are 07115 so the steps performed are:

1. Look up digits 07115 in table 2 and thereby determine that they relate to operator C.
2. Look up operator C and type X in table 1 and thereby determine that the tariff should be tariff 5.
3. Return an indication of tariff 5 to the requesting entity.

Thus the charging control unit can operate just as it did before, but the system as a whole will operate consistently with number portability.

In the system of FIG. 3 the IDP service requests are served against the intelligent network system. Core INAP (intelligent network application protocol) and CAP (CAMEL (customised applications for mobile networks enhanced logic) application part) signalling can be used.

Figure 5:
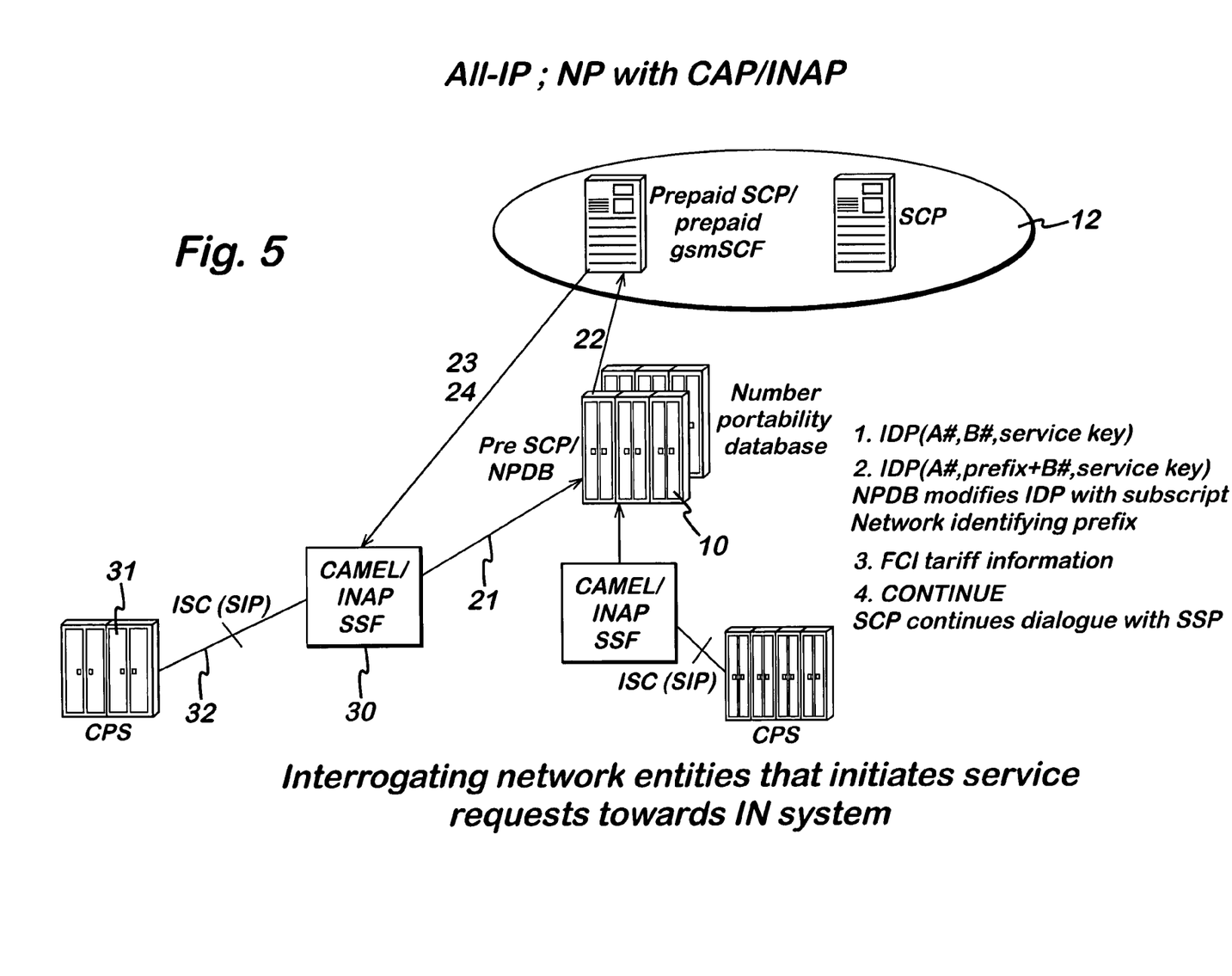
FIGS. 5 and 6 show alternative embodiments of the system of FIG. 3.
Figure 6:
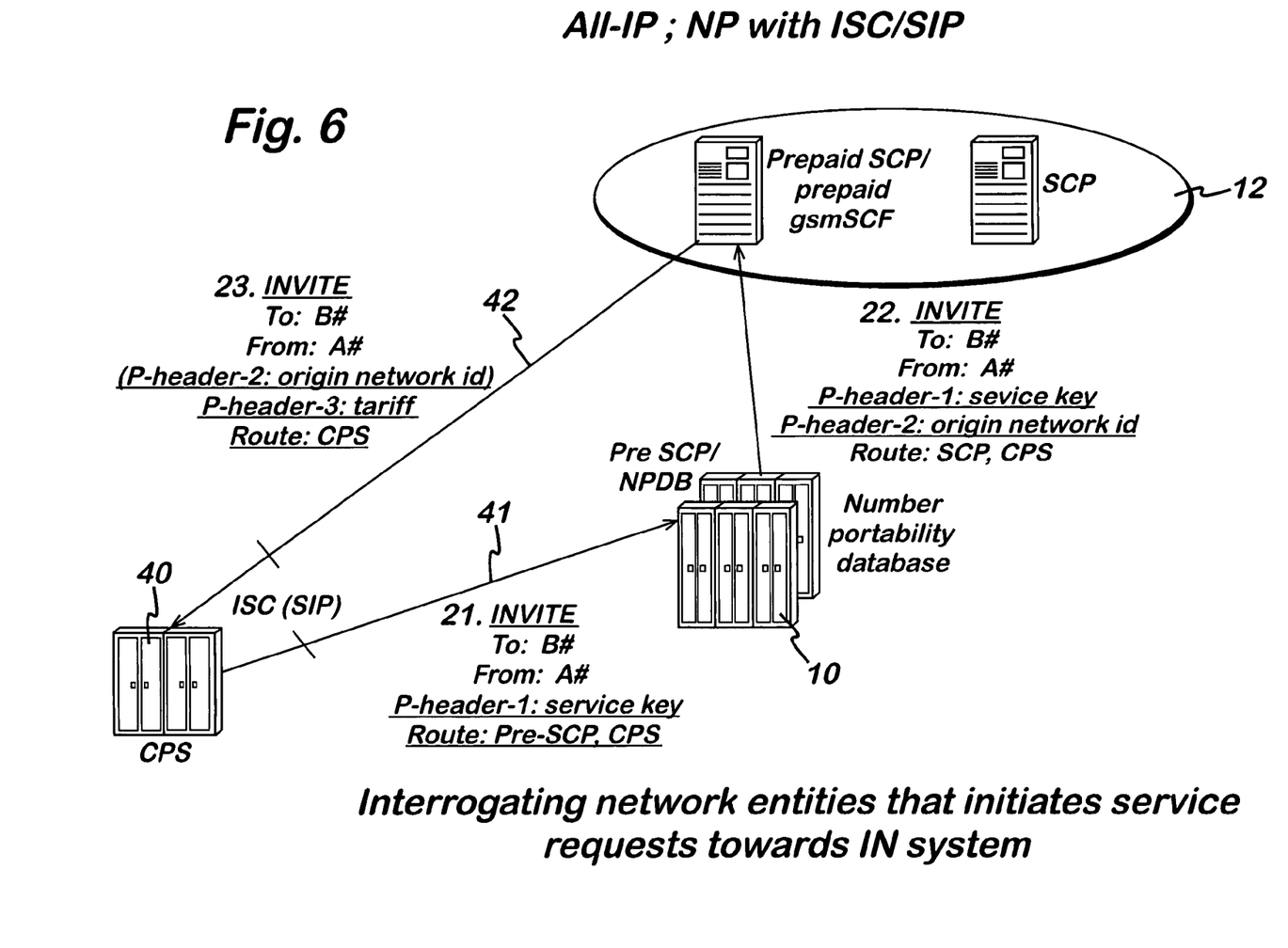

FIGS. 5 and 6 show two alternative embodiments of the system. In FIGS. 5 and 6 like components are numbered as for FIG. 3.

FIG. 5 shows an embodiment consistent with implementation in an IP Multimedia Subsystem (IMS) network (as specified in 3GPP TS 23.228 v.5.3.0) using CAP/INAP. A CAMEL/INAP SSF 30 takes the place of the SSP 11 of FIG. 3. The SSF 30 is connected to a CPS 31 over an ISC (SIP) interface 32. The CPS includes an S-CSCF as in a normal IMS network. This embodiment is useful when the IMS subscribers have E.164 addresses (in addition to logical IMS addresses).

In this embodiment the messages are sent as follows:
Step 21: IDP message specifying A number, B number and service key
Step 22: IDP message specifying A number, B number prefixed by the determined operator prefix and service key
Step 23: FCI tariff information message
Step 24: CONTINUE message Subsequently the SCP or SCF 12 continues a dialogue with the SSF 30 for exchanging tariff information during the pendency of the connection.

FIG. 6 shows an embodiment consistent with implementation in an IP Multimedia Subsystem (IMS) network using ISC/SIP signalling. A CPS 40 takes the place of the SSP 11 of FIG. 3. The CPS is connected to the formatter 10 and the SCP or SCF 12 over ISC (SIP) interfaces 41, 42. A more generic name, Application Server APSE), for the unit providing the functionality of the SCP or SCF, is often used in IMS networks In this embodiment the messages sent at steps 21, 22 and 23 are sent as SIP INVITE messages. The parameters of the messages are as follows:

Step 21: To: B number
    From: A number
    P-header-1: service key
    Route: formatter 10, CPS 40
Step 22: To: B number
    From: A number
    P-header-1: service key
    P-header-2: Operator prefix ("origin network ID")
    Route: SCP 12, CPS 40
Step 23: To: B number
    From: A number
    P-header-2: Operator prefix ("origin network ID")
    P-header-3: Tariff identification
    Route: CPS 40

Thus in this embodiment the basic SIP protocol can be used.

Note that even though the message sent at step 22 is from the formatter 10, the message's source is indicated in the message as being the CPS 40. This means that the response at step 23 can be sent back to the CPS 40, which originated the request for a tariff at step 21. (See the ISC specifications 3GPP TS 23.218 and RFC 3261). The formatter 10 does not include mention of itself in the Record-Route field of the SIP message sent at step 22 so that it will not be included on the route of subsequent SIP messages in the same session. Such messages could be sent to proceed with the connection setting (e.g. PRACK, UPDATE) or to release an active connection (BYE).

The same functionality can be provided also with IDP messages. (See FIG. 3). The formatter 10 does not include mention of itself when sending the message to the SCP 12. The message source is indicated in the message as being the SSP 11. This means that the response at steps 23 and 24 can be sent back to the SSP 11 which originated the request for a tariff at step 21.

To implement a system of the type illustrated in FIG. 6, the service profile of the A party could include the address of the formatter 10 but not that of the SCP 12. The formatter 10 could then include processing logic that can invoke a service interface or normal SIP interface towards the appropriate SCP/APSE etc. based on (for instance) the service identifier received in the P-header-1 of the message of step 21.

The SCP/APSE could omit the operator prefix, or "origin network ID", from the message sent at step 23, since the tariff information carried (in this example) in P-header-3 could be used by other services invoked from the CPS after APSE services have been completed.

The messages described above in connection with FIG. 6 make use of the P-header concept specified in IETF. Another mechanism for delivering the additional information carried in this example by the P-headers is the use of a special body part in the SIP message.

Providing a formatter 10 to provide the charging control unit 12 with an indication of the B subscriber's network has a number of advantages over other solutions. It requires little if any modification to existing charging control units—especially if the indication of the operator's network is passed in a similar form to that in which the charging control unit would process normally. For example, if the indication of the operator's network is normally a prefix to the B number then the indication of the operator's network can prefix the B number when it is sent by the formatter to the charging control unit. Other formats of subscriber ID are suitable for use in a similar way. For example if the indication of the operator's network is normally a suffix to the B number then the indication of the operator's network can suffix the B number when it is sent by the formatter to the charging control unit. Or if the indication of the operator's network is normally indicated by a flag in the B number then the indication of the operator's network can be indicated by a flag in the B number when it is sent by the formatter to the charging control unit Since little if any modification to conventional SCFs/SCPs is needed to implement the present invention it is especially suitable for operation in a multi-vendor environment.

The formatter 10 may be termed a number portability database (NPDB), especially a pre-SCP NPDB or a pre-gsmSCF NPDB.

The formatter needs to know which charging control unit it should access to determine the tariff. A given formatter could always access the same charging control unit. Alternatively, one way for it to determine which charging control unit to use is by analysis of the service key: the MSC (or the like) which sends the step 21 message to the formatter could modify the service key in such a way that it indicates the charging control unit that is to be used. Alternatively it could be formed from the service key using GT translations. FIG. 7 shows signalling between an MSC 60 (which could take the place of the SSP of FIG. 3), a formatter 61 (which could be integrated or closely linked with an SRRi) and a charging control function 62 (which could be an SCP or SCF) in order to use GT translations in this way.

Figure 7A:
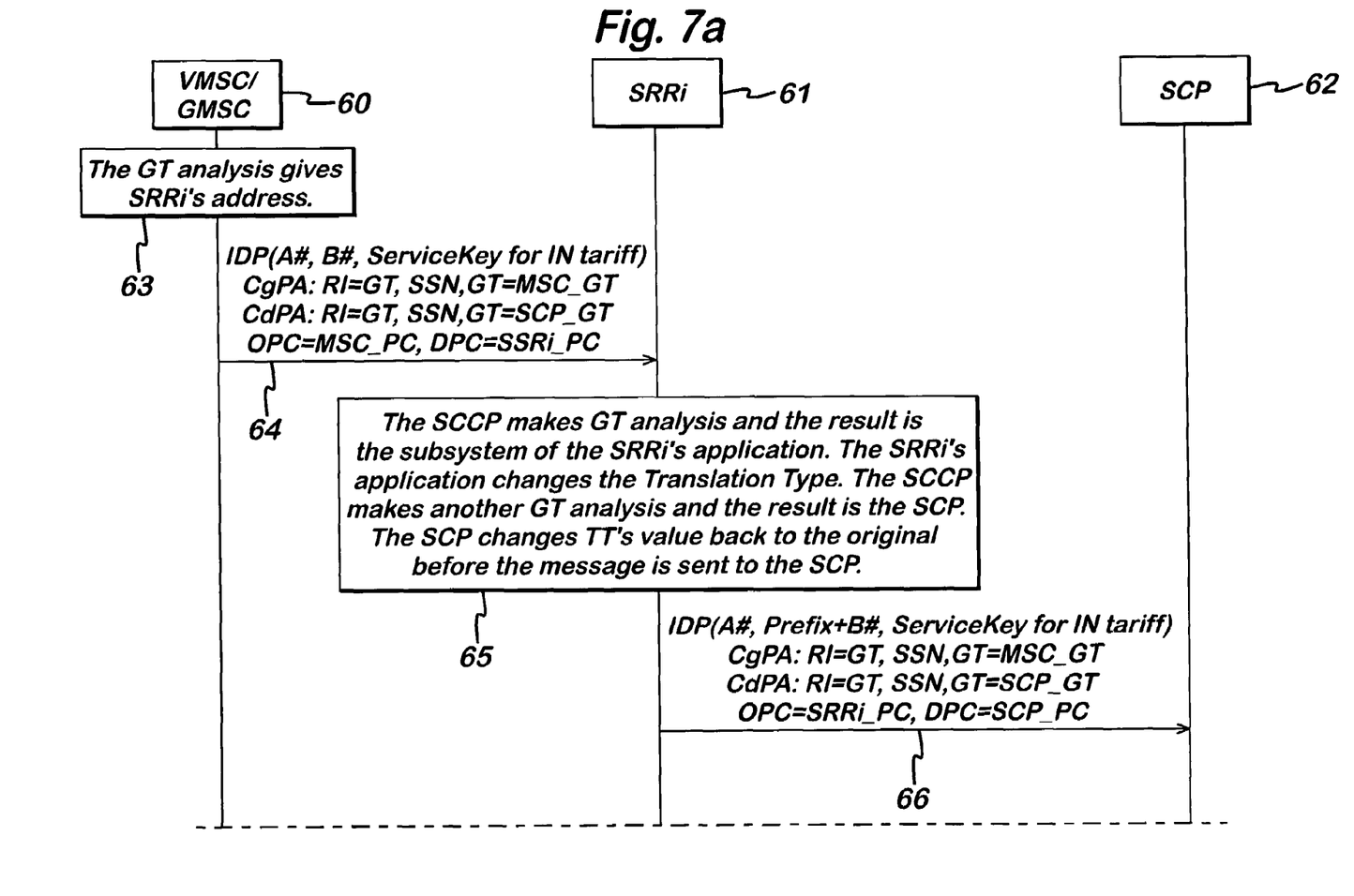
FIG. 7 shows GT transform embodiments.

The signalling in FIG. 7A is as follows.

Step 63: GT analysis at the VMSC/GMSC determines the SRRi's address.

Step 64: The VMSC/GMSC transmits to the SSRi an IDP message including the A number, the B number and a service key denoting an intelligent networking tariff. The signalling parameters are:

CgPA: RI=GT, SSN,GT=MSC_GT

CdPA: RI=GT,SSN,GT=SCP_GT

OPC=MSC_PC, DPC=SRRi

Step 65: The SCCP makes a GT analysis and the result is the subsystem of the SRRi's application. The SRRi's application changes the Translation Type (TT) for the signalling session. The SCCP makes another GT analysis and the result is the SCP. The SCCP changes the TT's value back to its original value before the IDP message is forwarded to the SCP.

Step 66: The SSRi transmits to the SCP an IDP message including the A number, the B number prefixed by the operator prefix and the service key for the intelligent networking tariff. The signalling parameters are:

CgPA:RI=GT, SSN,GT=MSC_GT

CdPA:RI=GT,SSN,GT=SCP_GT

OPC=SRRi_PC,DPC=SCP_PC

Step 67: Either the SCP changes its real address to the origGT address, or the routing indicator is changed to DPC+SSN Step 68: The SCP signals the tariff information to the VMSC/GMSC. Depending on the action taken at step 67 the signalling parameters are either:

Continue( )

CgPA:RI=GT,SSN,GT=real_SCP_GT

CdPA:RI=GT,SSN,GT=MSC_GT

OPC=SCP_PC,DPC=MSC_PC or:

Continue( )

CgPA:RI=DPC+SSN,GT=SCP_GT

CdPA:RI=GT,SSN,GT=MSC_GT

OPC=SCP_PC,DPC=MSC_PC

Step 69: The dialogue between VMSC and SCP can be arranged without the SRRi's intervention, if needed.

Figure 7B:
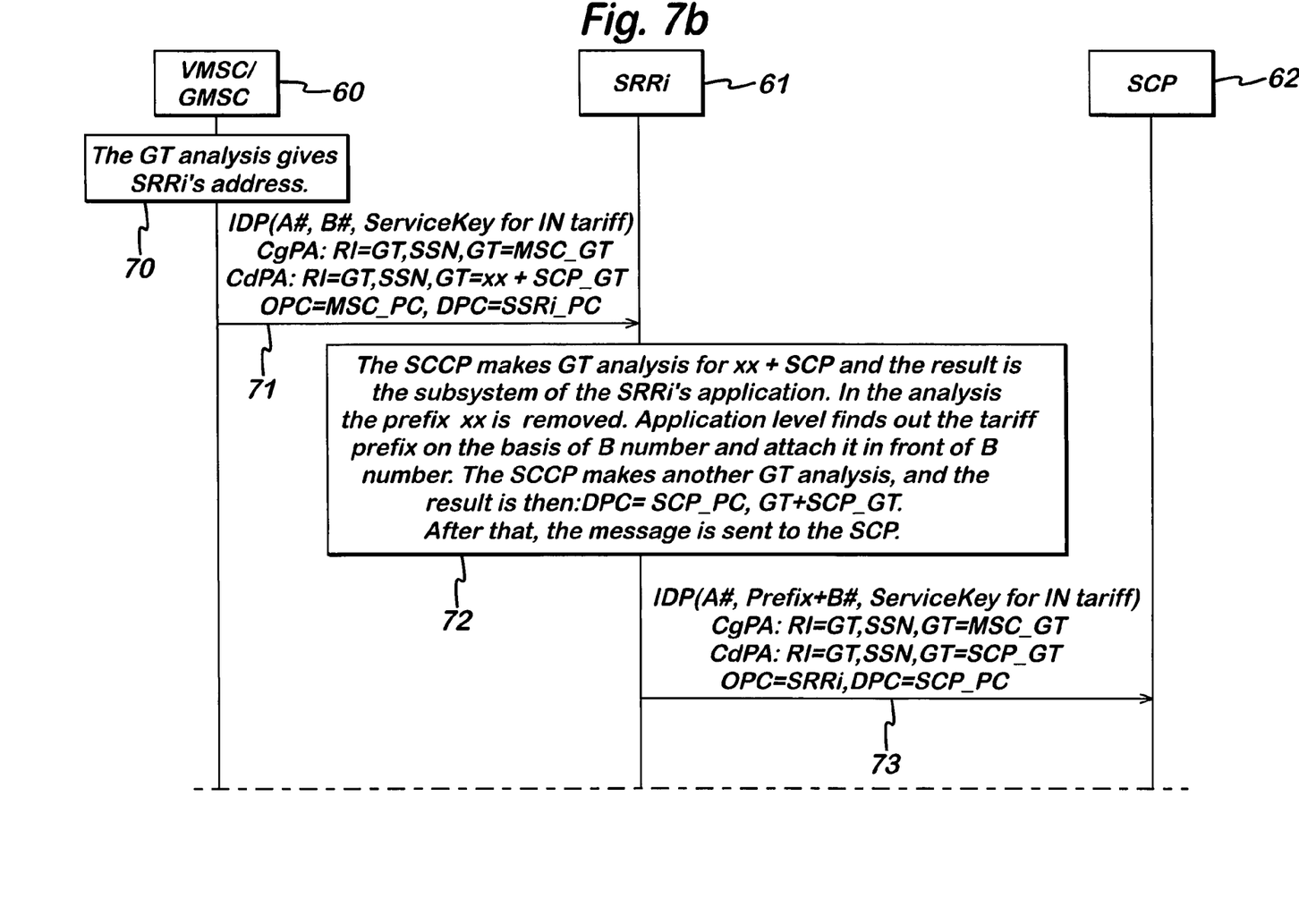

FIG. 7B shows an alternative method. The signalling in FIG. 7B is as follows.

Step 70: GT analysis at the VMSC/GMSC determines the SRRi's address.

Step 71: The VMSC/GMSC transmits to the SSRi an IDP message including the A number, the B number and a service key denoting an intelligent networking tariff. The signalling parameters are:

CgPA: RI=GT, SSN,GT=MSC_GT

CdPA: RI=GT,SSN,GT=xx+SCP_GT

OPC=MSC_PC, DPC=SRRi

Step 72: The SCCP makes GT analysis for xx+SCP and the result is the subsystem of the SRRi's application. In the analysis the prefix xx is removed. Application level processing determines the operator prefix on the basis of B number and attaches it in front of the B number for the message of step 73. The SCCP makes another GT analysis, and the result is then: DPC=SCP_PC, GT=SCP_GT. After that, the message of step 73 is sent to the SCP.

Step 73: The SSRi transmits to the SCP an IDP message including the A number, the B number prefixed by the operator prefix and the service, key for the intelligent networking tariff. The signalling parameters are:

CgPA:RI=GT, SSN,GT=MSC_GT

CdPA:RI=GT,SSN,GT=SCP_GT

OPC=SRRi_PC,DPC=SCP_PC

Step 74: In this case the SCP does not have to change its GT address. Subsequent messages can be directly routed to the SCP with GT=SCP_GT without intervention from the SRRi.

Step 75: The SCP signals the tariff information to the VMSC/GMSC. The signalling parameters are:

Continue( )

CgPA:RI=GT,SSN,GT=SCP_GT

CdPA:RI=GT,SSN,GT=MSC_GT

OPC=SCP_PC,DPC=MSC_PC

Step 76: The dialogue between VMSC and SCP can be arranged without the SRRi's intervention, if needed.

In addition to determining tariffs, as described above, the functionality of the formatter 10 could serve other purposes. For example, with knowledge of the B subscriber's network in a convenient form, by way of the subscriber prefix, a network could determine routings for a connection or could set one or more quality of service targets, for instance to meet inter-operator agreements.

The applicant hereby discloses in isolation each individual feature described herein and any combination of two or more such features, to the extent that such features or combinations are capable of being carried out based on the present specification as a whole in the light of the common general knowledge of a person skilled in the art, irrespective of whether such features or combinations of features solve any-problems disclosed herein, and without limitation to the scope of the claims. The applicant indicates that aspects of the present invention may consist of any such individual feature or combination of features. In view of the foregoing description it will be evident to a person skilled in the art that various modifications may be made within the scope of the invention.

The invention claimed is:

1. A method, comprising:
receiving a first message requesting a tariff for a connection and including a subscriber identity field comprising an indication of a subscriber identity of a terminal that is to terminate the connection, each terminal in a communications system being associated with any of a plurality of operators and being addressable by the subscriber identity formatted to include a first field and a second field, the first field being, for at least some of the subscriber identities, indicative of the operator with which a respective subscriber identity is associated;
determining the operator to which the subscriber identity of the terminal that is to terminate the connection is assigned, and content of the first field that is associated with that operator;
forming a modified subscriber identity having as a second field at least a content of the second field of the subscriber identity of the terminal that is to terminate the connection and having as a first field the content of the first field that is associated with that operator;
forming a second message requesting a tariff for a connection and including a subscriber identity field comprising the modified subscriber identity; and
transmitting the second message to a service control function configured to analyse a subscriber identity received in a message requesting a tariff for a connection to determine a tariff based on the first field of the received subscriber identity.

2. A method, comprising:
receiving a first message requesting a tariff for a connection, the first message comprising a subscriber identity field and an indication of the type of the connection, wherein the subscriber identity field comprises an indication of a subscriber identity of a terminal that is to terminate the connection, each terminal in a communications system being associated with any of a plurality of operators and being addressable by the subscriber identity formatted to include a first field and a second field, the first field being, for at least some of the subscriber identities, indicative of the operator with which a respective subscriber identity is associated;
determining the operator to which the subscriber identity of the terminal that is to terminate the connection is assigned, and content of the first field that is associated with that operator;
forming a modified subscriber identity having as a second field at least a content of the second field of the subscriber identity of the terminal that is to terminate the connection and having as a first field the content of the first field that is associated with that operator;
forming a second message requesting a tariff for a connection comprising a subscriber identity field comprising the modified subscriber identity and the indication of the type of the connection; and
transmitting the second message to a control function configured to analyze a subscriber identity received in a message requesting a tariff for a connection to determine a tariff based on the first field of the received subscriber identity and the indication of the type of the connection.

3. The method as claimed in claim 1, wherein the determining includes looking up the subscriber identity of the terminal that is to terminate the connection in a first database configured to store a list of subscriber identities and for each subscriber identity an indication of the operator with which the respective subscriber identity is associated and retrieving any indication of an operator associated therewith in the first database.

4. The method as claimed in claim 3, wherein the indication of an operator is the content of the first field that is associated with that operator.

5. The method as claimed in claim 3, wherein the determining comprises looking up the indication of an operator in a second database configured with a list of indicators of operators and for each indicator content of the first field that is associated with that operator and retrieving content of the first field associated therewith.

6. The method as claimed in claim 1, wherein the subscriber identity field of the message requesting the tariff for a connection does not include the first field of the subscriber identity of the terminal that is to terminate the connection.

7. The method as claimed in claim 1, wherein, if a determination is made that the content of the first field of the subscriber identity of the terminal is associated with the operator to which that subscriber identity is assigned, the second message requesting the tariff for a connection is formed with a subscriber identity field comprising the subscriber identity unmodified.

8. The method as claimed in claim 1, wherein the messages are initial detection point messages.

9. The method as claimed in claim 1, wherein the messages are session initiation protocol INVITE messages.

10. The method as claimed in claim 1, wherein each subscriber identity is a telephone number.

11. The method as claimed in any claim 1, wherein each first field is an operator prefix.

12. The method as claimed in claim 1, wherein the service control function comprises a service control point of an intelligent network.

13. The method as claimed in claim 1, wherein each message requesting the tariff for a connection comprises a source field for indicating a source of the message, the source field of the first message comprises an indication of the source of the first message and the source field of the second message comprises an indication of the source of the first message.

14. The method as claimed in claim 1, comprising:
controlling, by the service control function, the determining of the tariff for the connection; and
applying the tariff to the connection.

15. The method as claimed in claim 1, wherein the connection is a connection for transfer of data.

16. An apparatus, comprising:
an operator determination unit configured to receive a first message, comprising an indication of a subscriber identity of a terminal that is to terminate a connection, each terminal in a communications system configured to be associated with any of a plurality of operators and configured to be addressable by the subscriber identity formatted to include a first field and a second field, wherein the first field is configured to be, for at least some of the subscriber identities, indicative of a operator with which a respective subscriber identity is associated;
the operator determination unit further configured to determine the operator to which the subscriber identity of the terminal that is to terminate the connection is assigned, and content of the first field that is associated with that operator;

an identity modifier configured to receive the content and form a modified subscriber identity having as a second field at least a content of the second field of the subscriber identity of the terminal that is to terminate the connection and having as a first field the content of the first field that is associated with that operator;

a message former configured to receive the modified subscriber identity and form a second message requesting a tariff for a connection and including a subscriber identity field comprising the modified subscriber identity; and a message transmitter configured to transmit the second message to a service control function configured to control the analysis of a subscriber identity received in a message requesting a tariff for a connection to determine a tariff based on the first field of the received subscriber identity.

17. An apparatus, comprising:

receiving means for receiving a first message requesting a tariff for a connection and including a subscriber identity field comprising an indication of a subscriber identity of a terminal that is to terminate the connection, each terminal in a communications system being associated with any of a plurality of operators and being addressable by the subscriber identity formatted to include a first field and a second field, the first field being, for at least some of the subscriber identities, indicative of the operator with which a respective subscriber identity is associated;

determining means for determining the operator to which the subscriber identity of the terminal that is to terminate the connection is assigned, and content of the first field that is associated with that operator;

forming means for forming a modified subscriber identity having as a second field at least a content of the second field of the subscriber identity of the terminal that is to terminate the connection and having as a first field the content of the first field that is associated with that operator;

forming means for forming a second message requesting a tariff for a connection and including a subscriber identity field comprising the modified subscriber identity; and transmitting means for transmitting the second message to a service control point configured to analyze a subscriber identity received in a message requesting a tariff for a connection to determine a tariff based on the first field of the received subscriber identity.

18. A method as claimed in claim 1, wherein the service control function is a charging control function.

19. A method as claimed in claim 1, wherein the service control function is a tariff control function.

20. The apparatus as claimed in claim 16, wherein the service control point comprises a charging control function.

21. The apparatus as claimed in claim 16, wherein the service control point comprises a tariff control function.

22. The apparatus as claimed in claim 17, wherein the service control point comprises a charging control function.

23. The apparatus as claimed in claim 17, wherein the service control point comprises a tariff control function.

24. An apparatus, comprising:

an operator determination unit configured to receive a first message, comprising an indication of a type of the connection and an indication of a subscriber identity of a terminal that is to terminate a connection, each terminal in a communications system configured to be associated with any of a plurality of operators and configured to be addressable by the subscriber identity formatted to include a first field and a second field, wherein the first field is configured to be, for at least some of the subscriber identities, indicative of a operator with which a respective subscriber identity is associated;

the operator determination unit further configured to determine the operator to which the subscriber identity of the terminal that is to terminate the connection is assigned, and content of the first field that is associated with that operator;

an identity modifier configured to receive the content and form a modified subscriber identity having as a second field at least a content of the second field of the subscriber identity of the terminal that is to terminate the connection and having as a first field the content of the first field that is associated with that operator;

a message former configured to receive the modified subscriber identity and form a second message requesting a tariff for a connection and including a subscriber identity field comprising the modified subscriber identity and the indication of the type of the connection; and a message transmitter configured to transmit the second message to a service control function configured to control the analysis of a subscriber identity received in a message requesting a tariff for a connection to determine a tariff based on the first field of the received subscriber identity and the indication of the type of the connection.

25. The apparatus as claimed in claim 16, further configured to have access to a first database that stores a list of subscriber identities and for each one an indication of the operator with which the respective subscriber identity is associated, look up the subscriber identity of the terminal that is to terminate the connection in the first database, and retrieve any indication of an operator associated therewith in the first database.

26. The apparatus as claimed in claim 25, wherein the indication of an operator is the content of the first field that is associated with that operator.

27. The apparatus as claimed in claim 25, further configured to have access to a second database that stores a list of indicators of operators and for each one content of the first field that is associated with that operator, look up the indication of an operator in the second database, and retrieve content of the first field associated therewith.

28. The apparatus as claimed in claim 16, wherein the subscriber identity field of the message requesting the tariff for a connection does not include the first field of the subscriber identity of the terminal that is to terminate the connection.

29. The apparatus as claimed in claim 16, further configured that if a determination is made that the content of the first field of the subscriber identity of the terminal is associated with the operator to which that subscriber identity is assigned, the second message requesting the tariff for a connection is formed with its subscriber identity field comprising the subscriber identity unmodified.

30. The apparatus as claimed in claim 16, wherein the messages are initial detection point messages.

31. The apparatus as claimed in claim 16, wherein the messages are session initiation protocol INVITE messages.

32. The apparatus as claimed in claim 16, wherein each subscriber identity is a telephone number.

33. The apparatus as claimed in claim 16, wherein each first field is an operator prefix.

34. The apparatus as claimed in claim 16, wherein each message requesting the tariff for a connection comprises a source field for indicating a source of the message, the source field of the first message comprises an indication of the source of the first message and the source field of the second message comprises an indication of the source of the first message.

* * * * *

UNITED STATES PATENT AND TRADEMARK OFFICE
CERTIFICATE OF CORRECTION

| | | |
|---|---|---|
| PATENT NO. | : 7,590,678 B2 | Page 1 of 1 |
| APPLICATION NO. | : 10/603080 | |
| DATED | : September 15, 2009 | |
| INVENTOR(S) | : Jääskelä et al. | |

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1172 days.

Signed and Sealed this

Twenty-first Day of September, 2010

David J. Kappos
*Director of the United States Patent and Trademark Office*